US009325545B2

(12) United States Patent
Ray

(10) Patent No.: US 9,325,545 B2
(45) Date of Patent: Apr. 26, 2016

(54) SYSTEM AND METHOD FOR GENERATING AN ON-DEMAND MODULATION WAVEFORM FOR USE IN COMMUNICATIONS BETWEEN RADIOS

(75) Inventor: Gary Alan Ray, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 270 days.

(21) Appl. No.: 13/558,502

(22) Filed: Jul. 26, 2012

(65) Prior Publication Data

US 2014/0029680 A1 Jan. 30, 2014

(51) Int. Cl.
*H04L 27/00* (2006.01)
*H04L 1/00* (2006.01)
*H04W 52/26* (2009.01)
*H04W 24/04* (2009.01)

(52) U.S. Cl.
CPC ........... *H04L 27/0008* (2013.01); *H04L 1/0002* (2013.01); *H04W 24/04* (2013.01); *H04W 52/262* (2013.01)

(58) Field of Classification Search
CPC ..... H04L 1/18; H04L 27/0008; H04L 1/0002; H04W 72/04; H04W 88/08; H04W 72/0453; H04W 76/00; H04W 52/262; H04W 24/04
USPC .................................. 370/329, 338; 375/148
See application file for complete search history.

(56) References Cited

U.S. PATENT DOCUMENTS

| | | | | |
|---|---|---|---|---|
| 6,941,113 | B2* | 9/2005 | Asano | 455/73 |
| 7,269,153 | B1* | 9/2007 | Schultz et al. | 370/338 |
| 7,428,261 | B2* | 9/2008 | Mills et al. | 375/148 |
| 7,801,247 | B2* | 9/2010 | Onggosanusi et al. | 375/299 |
| 7,965,761 | B2* | 6/2011 | Shattil | 375/147 |
| 8,068,440 | B2* | 11/2011 | Stanwood et al. | 370/252 |
| 8,416,643 | B2* | 4/2013 | Magee | 367/138 |
| 8,635,077 | B2* | 1/2014 | Nakamura et al. | 704/503 |
| 2006/0293045 | A1* | 12/2006 | LaDue | 455/423 |
| 2007/0171915 | A1* | 7/2007 | Toyama et al. | 370/395.21 |
| 2007/0206701 | A1 | 9/2007 | Paley et al. | |
| 2010/0299582 | A1* | 11/2010 | Del Angel et al. | 714/792 |

FOREIGN PATENT DOCUMENTS

| | | |
|---|---|---|
| WO | WO2004100416 A1 | 11/2004 |
| WO | WO2007001707 A2 | 1/2007 |

OTHER PUBLICATIONS

Lobo et al., "Applications of second-order cone programming," Linear Algebra and its Applications, vol. 284, Issues 1-3, Nov. 1998, pp. 193-228.

(Continued)

*Primary Examiner* — Alpus H Hsu
*Assistant Examiner* — Anthony Luo
(74) *Attorney, Agent, or Firm* — Yee & Associates, P.C.

(57) ABSTRACT

A method and apparatus for managing communications between communications systems is provided. A set of data channels available for use in exchanging data between a communications system and a set of communications systems is identified. A number of constraints for a modulation waveform are identified based on the set of data channels identified and environmental information about a communications environment for the communications between a radio and a set of radios. The modulation waveform that meets the number of constraints is identified. The modulation waveform is configured for use in exchanging the data between the communications system and the set of communications systems over the set of data channels.

23 Claims, 10 Drawing Sheets

(56) References Cited

OTHER PUBLICATIONS

Kay, "Cramar-Rao Lower Bound," Fundamentals of Statistical Signal Processing; Estimation Theory, vol. 1, Ch. 3, Prentice Hall, Inc., copyright 1993, pp. 27-36.

Extended European Search Report, dated Feb. 1, 2016, regarding Application No. EP13174595.2, 8 pages.
Extended European Search Report, dated Jan. 1, 2016, regarding Application No. EP13174595.2, 8 pages.

* cited by examiner

SYSTEM AND METHOD FOR GENERATING AN ON-DEMAND MODULATION WAVEFORM FOR USE IN COMMUNICATIONS BETWEEN RADIOS

BACKGROUND INFORMATION

1. Field

The present disclosure relates generally to wireless communications systems, and in particular, to radio communications systems. Still more particularly, the present disclosure relates to a system and method for generating an on-demand modulation waveform for use in exchanging data between radio communications systems.

2. Background

A radio communications system may be configured to send and/or receive data using radio waves. Radio waves include the electromagnetic waves having frequencies between about 3 kilohertz and about 300 gigahertz. These frequencies are referred to as radio frequencies (RF).

A software defined radio (SDR) is a radio communications system in which one or more of the physical layer functions of the radio communications system are defined by software, firmware, or a combination of the two running on one or more hardware devices. Different types of hardware devices may be used to run the software and/or firmware. These different types of hardware devices may include, for example, without limitation, a field programmable gate array (FPGA), a digital signal processor (DSP), a general purpose processor (GPP), a programmable system on chip (SoC), and other types of programmable processor units.

A software defined radio may include a transmitter and a receiver. When data is to be transmitted from the software defined radio, the transmitter modulates a sampled modulation waveform, with the data. In other words, the selected data is encoded within the modulation waveform. The modulated modulation waveform is then used to modulate a carrier waveform such that the data is carried in the carrier waveform. The modulated carrier waveform may then be transmitted in the form of radio waves. Conversely, in response to the software defined radio receiving radio waves carrying data, the receiver uses a sampled modulation waveform to perform demodulation such that the data may be extracted.

With some currently available software defined radios, the modulation waveform used for modulation and demodulation is selected from a set of predefined modulation waveforms for a corresponding set of predefined bandwidths. This selection may be made based on the set of data channels selected for use in exchanging data between these software defined radios. As used herein, a "channel" is a selected range of continuous frequencies.

In particular, a modulation waveform is selected for each channel in the set of data channels. More specifically, the modulation waveform in the set of predefined modulation waveforms that best matches the conditions for a channel is selected for that channel. These conditions may include, for example, a maximum energy capacity, a bandwidth, a level of noise, and/or conditions for the channel.

However, the set of predefined modulation waveforms may not include modulation waveforms that match the conditions of the channels selected for communications as accurately as desired. When the modulation waveform selected for a particular channel does not match the conditions of the channel as accurately as desired, the level of performance of the software defined radio in exchanging data over this channel may be lower than desired. Therefore, it would be desirable to have a method and apparatus that takes into account at least some of the issues discussed above, as well as other possible issues.

SUMMARY

In one illustrative embodiment, a method for managing communications between communications systems is provided. A set of data channels available for use in exchanging data between a communications system and a set of communications systems is identified. A number of constraints for a modulation waveform are identified based on the set of data channels identified and environmental information about a communications environment for the communications between a radio and a set of radios. The modulation waveform that meets the number of constraints is identified. The modulation waveform is configured for use in exchanging the data between the communications system and the set of communications systems over the set of data channels.

In another illustrative embodiment, an apparatus comprises a channel manager and a waveform manager in a communications system. The channel manager is configured to identify a set of data channels available for use in exchanging data between the communications system and a set of communications systems. The waveform manager is configured to identify a number of constraints for a modulation waveform based on the set of data channels identified and environmental information about a communications environment for communications between a radio and a set of radios. The waveform manager is configured to identify the modulation waveform that meets the number of constraints. The modulation waveform is configured for use in exchanging the data between the communications system and the set of communications systems over the set of data channels.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
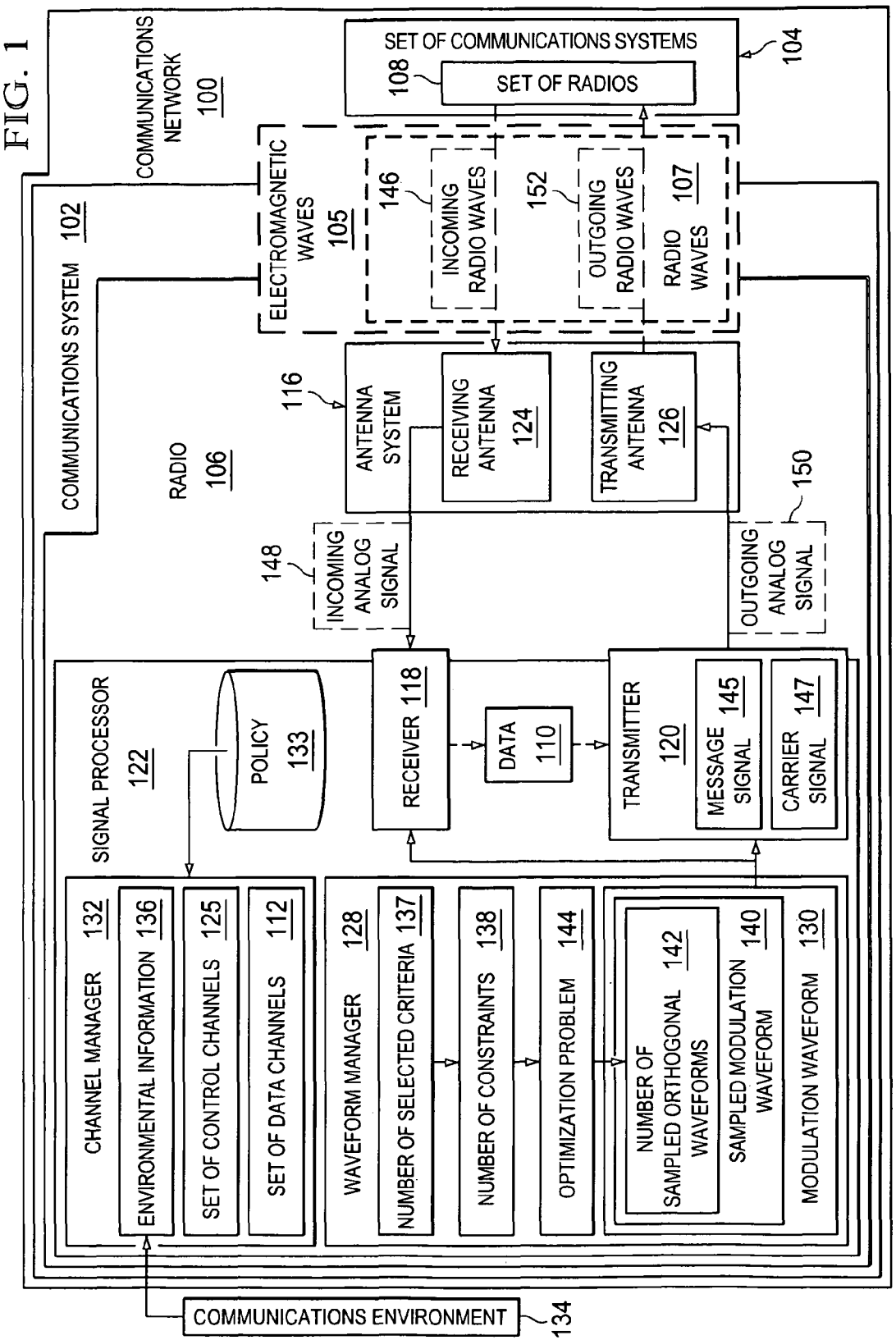
FIG. 1 is an illustration of a communications network in the form of a block diagram in which an illustrative embodiment may be implemented.

The different illustrative embodiments recognize and take into account different considerations. For example, the illustrative embodiments recognize and take into account that it may be desirable to perform modulation and demodulation when exchanging data over a particular channel using a modulation waveform that matches conditions for the particular channel with a desired level of accuracy. In particular, using a modulation waveform design specifically for the conditions for the particular channel may provide a higher level of performance for the exchanging of data over the channel as compared to selecting a modulation waveform from a set of predefined modulation waveforms.

The different illustrative embodiments also recognize and take into account that some currently available software defined radios are capable of exchanging data over multiple channels simultaneously. With these types of software defined radios, each channel used for communications may be handled independently of the other channels that are used.

For example, a transmitter in a software defined radio may send data to one or more other software defined radios over multiple channels. With some currently available software defined radios, the encoding of data for transmission over each of these multiple channels is handled independently of the other channels. This type of modulation process may cause certain channels to have a lower level of performance for communications than other channels. In other words, the level of performance may vary across the set of data channels.

Additionally, a receiver in a software defined radio may receive data over multiple channels. With some currently available software defined radios, the receiver may perform synchronization for each of these multiple channels independently of the other channels.
Synchronization may include identifying the delay between the transmitting of radio waves and the receiving of those radio waves.

The different illustrative embodiments recognize and take into account that performing synchronization for each of the multiple channels independently of the other channels may require a more complex receiver than desired. Consequently, the different illustrative embodiments recognize and take into account that it may be desirable to have a receiver configured to perform synchronization across all of the channels used for communications.

Thus, the different illustrative embodiments provide a method and apparatus for managing communications within a wireless communications network. In one illustrative embodiment, a method for managing communications between communications systems is provided. A set of data channels available for use in exchanging data between a communications system and a set of communications systems is identified. A number of constraints for a modulation waveform are identified based on the set of data channels identified and environmental information about a communications environment for communications between the radio and the set of radios. The modulation waveform that meets the number of constraints is identified. The modulation waveform is configured for use in exchanging the data between the communications system and the set of communications systems over the set of data channels.

With reference now to FIG. 1, an illustration of a communications network in the form of a block diagram is depicted in accordance with an illustrative embodiment. In these illustrative examples, communications network 100 comprises communications systems configured to communicate with each other wirelessly. Communications system 102 is an example of a communications system in communications network 100.

Communications system 102 is configured to communicate wirelessly with set of communications systems 104 in communications network 100 using electromagnetic waves 105. As used herein, a "set of" items means one or more items. In this manner, set of communications systems 104 means one or more communications systems.

In these illustrative examples, communications system 102 takes the form of radio 106 and set of communications systems 104 takes the form of set of radios 108. Radio 106 is configured to communicate with set of radios 108 using radio waves 107. Radio waves 107 are the type of electromagnetic waves 105 having frequencies between about 3 kilohertz and about 300 gigahertz. These frequencies are referred to as radio frequencies (RF).

Radio 106 and set of radios 108 are software defined radios in these illustrative examples. As used herein, a "software defined radio" is a combination of hardware and software. In particular, with software defined radios, one or more of the physical layer functions of these radios are performed by software, firmware, or a combination of the two running on one or more hardware devices.

In these illustrative examples, radio 106 comprises antenna system 116, receiver 118, transmitter 120, and signal processor 122. In some cases, receiver 118 and transmitter 120 may be together referred to as a transceiver.

Antenna system 116 may comprise one or more antennas, depending on the implementation. In one illustrative example, antenna system 116 comprises receiving antenna 124 configured to receive radio waves 107 and transmitting antenna 126 configured to send radio waves 107. In another illustrative example, antenna system 116 comprises a single antenna configured to both receive and transmit radio waves 107.

In these illustrative examples, receiver 118, transmitter 120, and signal processor 122 comprise a combination of both hardware and at least one of software and firmware. Further, in these examples, a portion of signal processor 122 may be considered part of receiver 118, while a portion of signal processor 122 may be considered part of transmitter 120. In some cases, a portion of signal processor 122 may be shared by both receiver 118 and transmitter 120. Each radio in set of radios 108 may be implemented in a manner similar to radio 106.

Radio 106 and set of radios 108 are configured to coordinate with each other over set of control channels 125 that have been previously established. In particular, radio 106 and set of radios 108 may coordinate over set of control channels 125 to establish communications over set of data channels 112. As used herein, a "channel", such as a channel in set of data channels 112 or in set of control channels 125, is a selected range of frequencies.

In some cases, the selected range of frequencies may comprise a single frequency. When more than one frequency is included in the selected range of frequencies, the selected range of frequencies may be a "band" of continuous frequencies. The difference between the upper limit and lower limit of the selected range of frequencies for a particular channel may be referred to as the bandwidth of that channel.

The different channels in set of data channels 112 and set of control channels 125 may be contiguous channels and/or non-contiguous channels, depending on the implementation. Two channels are contiguous if there are no frequencies present between the two ranges of frequencies for these channels. Two channels are non-contiguous if at least one frequency is present between the two ranges of frequencies for these channels.

In these illustrative examples, radio 106 and set of radios 108 are configured to coordinate with each other and share information over set of control channels 125. However, in some cases, radio 106 may need to establish communications between radio 106 and set of radios 108 over a different set of data channels for the exchange of data 110 between radio 106 and set of radios 108. This exchange of data 110 may include radio 106 sending data 110 to set of radios 108, radio 106 receiving data 110 from set of radios 108, or a combination of the two.

For example, communications may need to be established such that radio 106 can send data 110 to set of radios 106. In response to a demand for communications between radio 106 and set of radios 108, channel manager 132 in signal processor 122 is configured to identify which channels within the radio frequency portion of the electromagnetic spectrum are available for establishing communications between radio 106 and set of radios 108 for the exchange of data 110. Channel manager 132 selects at least one of these available channels to form set of data channels 112. When multiple channels are present in set of data channels 112, these channels may be contiguous channels and/or non-contiguous channels.

Channel manager 132 may identify set of data channels 112 in a number of different ways using different types of information. For example, channel manager 132 may use energy measurements within each potential channel of communications for radio 106 to determine whether the channel is available for use or is currently in use.

In some cases, channel manager 132 may also use policy 133 to determine whether a channel available to radio 106 can actually be used for communications and/or whether only a portion of an available channel can be used. As used herein, a "policy", such as policy 133, is any combination of regulations, rules, requirements, and/or conditions. In these illustrative examples, policy 133 may comprise, for example, without limitation, at least one of regulatory rules for wireless communications, government rules for wireless communications, security clearance information, limitations of the hardware components in the radios, rules based on user input, and other rules for communications between radio 106 and/or set of radios 106.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; or some other combination.

Additionally, channel manager 132 may use environmental information 136 to identify set of data channels 112. Environmental information 136 comprises information about communications environment 134 at the time of demand for communications between radio 106 and set of radios 108. In these illustrative examples, communications environment 134 is the radio frequency environment with respect to radio 106.

Environmental information 136 includes information determined using radio waves 107 received at radio 106. Environmental information 136 may identify, for example, without limitation, the presence of an interference signal, the presence of a jamming signal, the presence of multi-path interference, characteristics about the noise within one or more channels, and/or other types of environmental information with respect to the channels available for use by radio 106.

Channel manager 132 in radio 106 is configured to coordinate with corresponding channel managers in set of radios 108 over set of control channels 125 to come to an agreement regarding which channels to include in set of data channels 112. For example, without limitation, channel manager 132 may send an identification of set of data channels 112 over set of control channels 125.

Once set of data channels 112 has been identified, waveform manager 128 in signal processor 122 is configured to identify number of selected criteria 137 for modulation waveform 130. As used herein, a "number of" items means one or more items. In this manner, number of selected criteria 137 may be one or more pieces of selected criteria. In these illustrative examples, a sampled form of modulation waveform 130 will be used to encode and carry data 110. In particular, a sampled form of modulation waveform 130 will be modulated by data 110.

Number of selected criteria 137 is criteria for modulation waveform 130 based on set of data channels 112. In particular, number of selected criteria 137 may be criteria based on at least one of environmental information 136, policy 133, a desired level of performance for radio 106, power requirements, energy requirements, and other types of conditions associated with set of data channels 112.

In these illustrative examples, waveform manager 128 uses number of selected criteria 137 to design number of constraints 138. A constraint in number of constraints 138 is a mathematical condition that represents at least one of number of selected criteria 137. Number of constraints 138 may be used to form optimization problem 144.

As used herein, an "optimization problem" is a mathematical problem in which the aim is to find a solution that minimizes or maximizes a set of parameters. In these illustrative examples, optimization problem 144 is a constraint optimization problem. As used herein, a "constraint optimization problem" is a mathematical problem in which the aim is to find a solution that satisfies all of a selected number of constraints, while minimizing or maximizing a set of parameters. In this manner, optimization problem 144 requires that a solution to optimization problem 144 satisfy number of constraints 138.

Waveform manager 128 is configured to solve optimization problem 144 to generate sampled modulation waveform 140. Sampled modulation waveform 140 may be the sampled form of modulation waveform 130. As depicted, sampled modulation waveform 140 comprises number of sampled orthogonal waveforms 142. In these illustrative examples, waveform manager 128 identifies number of sampled orthogonal waveforms 142 that meet all of number of constraints 138 and for which a negative of a sum of the differences squared of number of sampled orthogonal waveforms 142 is minimized.

This minimization may be described as follows:

$$\min_{s=\{s_i^j\}} -\sum_{j=0}^{K-1}\sum_{i=0}^{N-1} |s_{i+1}^j - s_i^j|^2$$

where K is the number of sampled orthogonal waveforms in number of sampled orthogonal waveforms 142, N is the number of samples desired for each orthogonal waveform, and $\{s_i^j\}$, i=0, 1, 2, ..., N−1, j=0, 1, 2, ..., K−1 are the samples. This minimization may also be considered a constraint in number of constraints 138 for optimization problem 144.

Optimization problem 144 may be set up and solved using any number of currently available techniques. In one illustrative example, optimization problem 144 may be formed as a constrained minimization of a non-linear multi-variable function. In another illustrative example, optimization problem 144 may be formed using Karush-Kuhn-Tucker (KKT) equations. In yet another illustrative example, quadratic programming techniques that use second order cone programs (SOCP) may be used to form optimization problem 144.

By designing number of sampled orthogonal waveforms 142 such that the samples, $\{s_i^j\}$, meet number of constraints 138, sampled modulation waveform 140 may be customized for the situation specific to communications between radio 106 and set of radios 108 over set of data channels 112 and under the conditions of communications environment 134. In this manner, sampled modulation waveform 140 may be designed and generated on-demand.

Once sampled modulation waveform 140 has been designed, at least one cycle of sampled modulation waveform 140 is generated and stored by waveform manager 128. These values for sampled modulation waveform 140 may be sent to set of radios 108 over set of control channels 125 such that communications between radio 106 and set of radios 108 may be coordinated. Thereafter, radio 106 may use sampled modulation waveform 140 to send data 110 to set of radios 108 over set of data channels 112.

In particular, transmitter 120 uses sampled modulation waveform 140 to encode data 110. More specifically, transmitter 120 modulates sampled modulation waveform 140 using data 110 to form message signal 145.

Transmitter 120 modulates carrier signal 147 using message signal 145 to form outgoing analog signal 150. Carrier signal 147 may be a digital signal having an intermediate frequency. Modulating carrier signal 147 with message signal 145 may be referred to as up-converting message signal 145 to an intermediate frequency. Outgoing analog signal 150 is an analog signal up-converted to a higher radio frequency.

In one illustrative example, message signal 145 may be a digital baseband signal having frequencies between about 0 kilohertz and about 500 kilohertz. In this example, carrier signal 147 may have frequencies between about 49 megahertz and about 49.5 megahertz. Further, outgoing analog signal 150 may have frequencies between about 1.0 gigahertz and about 1.0005 gigahertz in this illustrative example.

Transmitter 120 sends outgoing analog signal 150 to transmitting antenna 126. Transmitting antenna 126 converts outgoing analog signal 150 into outgoing radio waves 152 and sends outgoing radio waves 152 over set of data channels 112. A radio in set of radios 108 that receives outgoing radio waves 152 transmitted by transmitting antenna 126 may use sampled modulation waveform 140 to perform demodulation and extract data 110.

When data 110 is to be received at radio 106 over set of data channels 112 from a particular radio in set of radios 108, that radio may send sampled modulation waveform 140 to radio 106. In this illustrative example, waveform manager 128 stores sampled modulation waveform 140 for use in demodulating a signal received from the particular radio in set of radios 108.

For example, receiving antenna 124 may receive incoming radio waves 146 over set of data channels 112. Receiving antenna 124 converts incoming radio waves 146 into incoming analog signal 148. Receiving antenna 124 sends incoming analog signal 148 to receiver 118 for processing. Receiver 118 is configured to demodulate incoming analog signal 148 to retrieve a message signal. Receiver 118 then uses sampled modulation waveform 140 to demodulate the message signal and extract data 110.

In some illustrative examples, waveform manager 128 is configured to modify sampled modulation waveform 140 during communications over set of data channels 112. For example, waveform manager 128 may be configured to modify sampled modulation waveform 140 in response to changes in communications environment 134, new user input, changes to policy 133, and/or other types of changes. When waveform manager 128 modifies sampled modulation waveform 140, waveform manager 128 may send an identification of these modifications or the modified sampled modulation waveform to set of radios 108 over set of control channels 125. In this manner, modulation waveform 130 may be customizable and adaptable.

The illustrative embodiments described above provide a system and method for generating sampled modulation waveform 140 that satisfies number of selected criteria 137 for modulation waveform 130. Further, sampled modulation waveform 140 is generated such that sampled modulation waveform 140 may be used for modulation across the entire set of data channels 112. In particular, each of number of sampled orthogonal waveforms 142 may correspond to a channel in set of data channels 112.

In these illustrative examples, modulation waveform 130, designed on-demand based on set of data channels 112 and number of selected criteria 137, may match the conditions for set of data channels 112 with a level of accuracy higher than a modulation waveform selected from a set of predefined modulation waveforms for a set of predefined bandwidths. Further, communications between radio 106 and set of radios 108 using sampled modulation waveform 140 may have a higher level of performance over set of data channels 112 as compared to the level of performance for communications using a modulation waveform selected from a set of predefined modulation waveforms.

Figure 2:
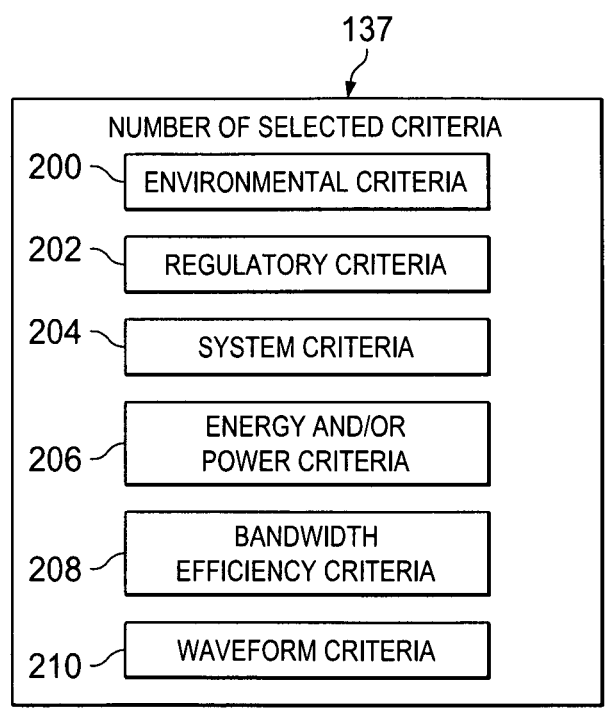
FIG. 2 is an illustration of a number of selected criteria for a modulation waveform in the form of a block diagram in accordance with an illustrative embodiment.

With reference now to FIG. 2, an illustration of a number of selected criteria for a modulation waveform in the form of a block diagram is depicted in accordance with an illustrative embodiment. In this illustrative example, different types of criteria that may be included in number of selected criteria 137 used to design number of constraints 138 for sampled modulation waveform 140 in FIG. 1 are described.

Number of selected criteria 137 may include, for example, without limitation, at least one of environmental criteria 200, regulatory criteria 202, system criteria 204, energy and/or power criteria 206, bandwidth efficiency criteria 208, waveform criteria 210, and/or other suitable types of criteria. In some cases, criteria of a particular type may be the same as or overlap with criteria if another type.

Environmental criteria 200 may include criteria for sampled modulation waveform 140 based on communications environment 134 in FIG. 1. For example, environmental criteria 200 may require that sampled modulation waveform 140 be able to be used in the presence of known interference and/or known multi-path interference within communications environment 134.

Regulatory criteria 202 may include criteria based on, for example, government regulations, local area regulations, wireless communications rules, and/or other types of regulatory criteria. System criteria 204 may include criteria based on, for example, specifications for and/or limitations of the hardware components that make up radio 106 and/or set of radios 108 in FIG. 1.

Energy and/or power criteria 206 may include, for example, energy and/or power restrictions for communications over set of data channels 112 in FIG. 1. In some cases, one or more of these restrictions may be set by regulations and/or based on communications environment 134. In this manner, one or more criteria in energy and/or power criteria 206 may overlap with regulatory criteria 202 and/or environment criteria 200.

Bandwidth efficiency criteria 208 may require that sampled modulation waveform 140 be designed to use a percentage of the available bandwidth capacity of each channel in set of data channels 112 over a selected threshold. In other words, bandwidth efficiency criteria 208 may require that the bandwidth efficiency of sampled modulation waveform 140 be above a selected threshold.

Waveform criteria 210 may include, for example, criteria for the characteristics of sampled modulation waveform 140 and the performance of sampled modulation waveform 140. For example, waveform criteria 210 may require that sampled modulation waveform 140 meet frequency requirements set by regulations and/or based on communications environment 134. In this manner, one or more criteria in waveform criteria 210 may overlap with regulatory criteria 202 and/or environmental criteria 200. Waveform criteria 210 may also require that sampled modulation waveform 140 be capable of being synchronized between a transmitter and a receiver with a desired level of accuracy.

Further, waveform criteria 210 may require that sampled modulation waveform 140 comprise a basis set of sampled orthogonal waveforms. In some cases, waveform criteria 210 may also require that the symbol error rate performance of sampled modulation waveform 140 be easy to estimate using currently available techniques.

The illustrations of communications network 100 in FIG. 1 and number of selected criteria 137 in FIG. 2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, a unit separate from channel manager 132 may be configured to identify environmental information 136. Further, in other illustrative examples, number of selected criteria 137 may include criteria in addition to and/or in place of the criteria described in FIG. 2.

Figure 3:
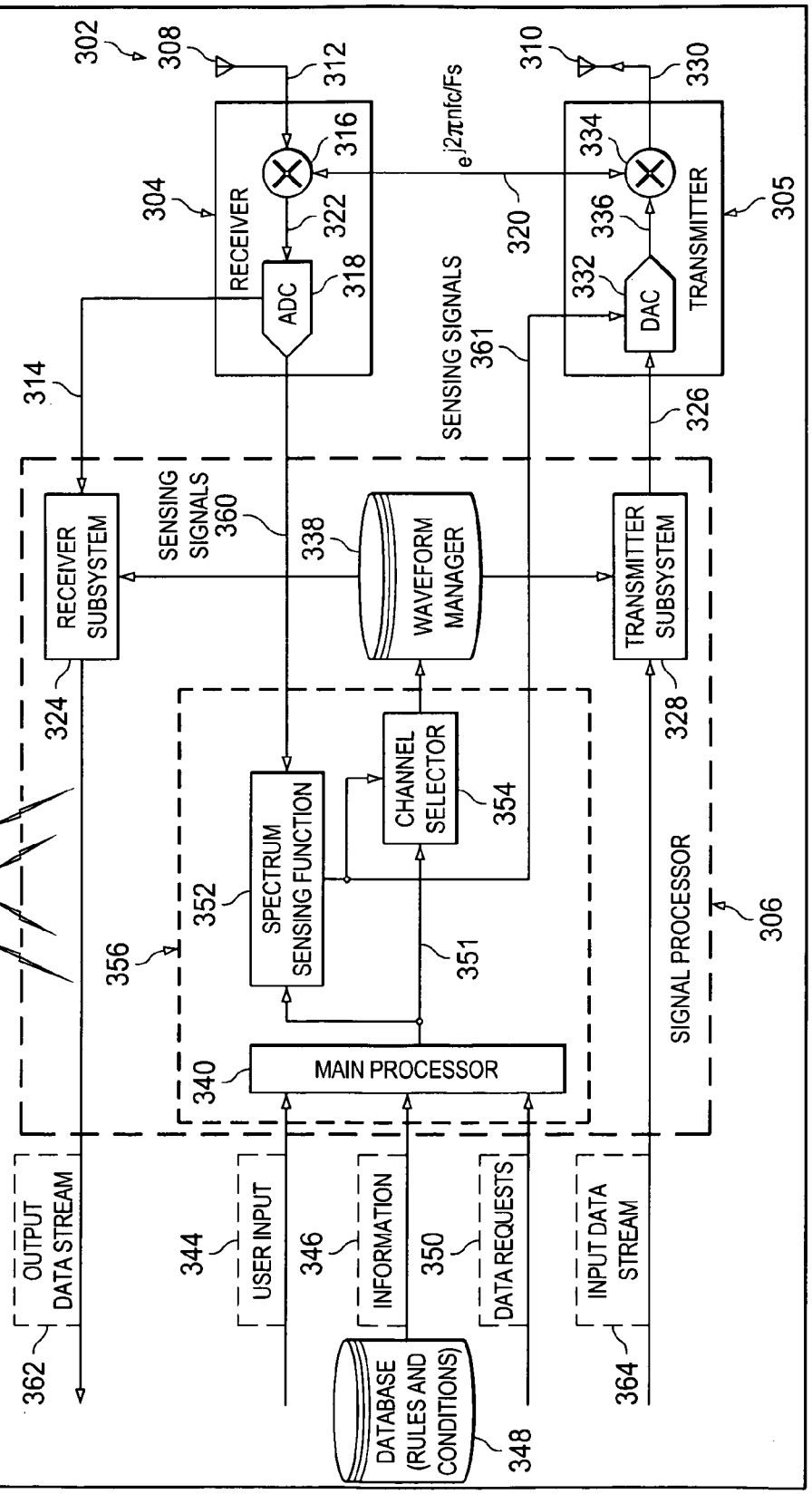
FIG. 3 is an illustration of a radio in accordance with an illustrative embodiment.

With reference now to FIG. 3, an illustration of a radio is depicted in accordance with an illustrative embodiment. In this illustrative example, radio 300 is an example of one implementation for radio 106 in FIG. 1. Radio 300 is a software defined radio in this example.

As depicted, radio 300 comprises antenna system 302, receiver 304, transmitter 305, and signal processor 306. Antenna system 302, receiver 304, transmitter 305, and signal processor 306 are examples of implementations of antenna system 116, receiver 118, transmitter 120, and signal processor 122 in FIG. 1. At least a portion of signal processor 306 is considered part of receiver 304 and at least a portion of signal processor 306 is considered part of transmitter 305.

In this illustrative example, antenna system 302 includes receiving antenna 308 and transmitting antenna 310. Receiving antenna 308 and transmitting antenna 310 are examples of implementations of receiving antenna 124 and transmitting antenna 126, respectively, in antenna system 116 in FIG. 1.

Receiving antenna 308 is configured to detect radio waves and convert these radio waves into incoming analog signal 312. Incoming analog signal 312 is an example of one implementation for incoming analog signal 148 in FIG. 1. Receiver 304 is configured to receive incoming analog signal 312 and form digital message signal 314.

As depicted, receiver 304 comprises demodulation unit 316 and analog to digital converter (ADC) 318 in receiver 304. Demodulation unit 316 demodulates incoming analog signal 312 using carrier signal 320 to form analog message signal 322. Carrier signal 320 is an analog signal in this example.

Analog to digital converter 318 converts analog message signal 322 into a digital signal to form digital message signal 314. Analog to digital converter 318 sends digital message signal 314 to receiver subsystem 324 in signal processor 306 for processing. Receiver subsystem 324 is the portion of signal processor 306 that is considered to be part of receiver 304.

Similarly, transmitter 305 is configured to receive digital message signal 326 from transmitter subsystem 328 in signal processor 306. Transmitter subsystem 328 is the portion of signal processor 306 that is considered to be part of transmitter 305. Transmitter 305 is configured to receive digital message signal 326 and form outgoing analog signal 330. Outgoing analog signal 330 is an example of one implementation for outgoing analog signal 150 in FIG. 1.

As depicted, transmitter 305 comprises digital to analog converter (DAC) 332 and demodulation unit 334. Analog to digital converter 332 converts digital message signal 326 into analog message signal 336. Modulation unit 334 modulates carrier signal 320 using analog message signal 336 to form outgoing analog signal 330. Transmitter 305 sends outgoing analog signal 330 to transmitting antenna 310. Transmitting antenna 310 is configured to transmit outgoing analog signal 330 in the form of radio waves.

In this illustrative example, signal processor 306 comprises channel manager 356 and waveform manager 338. Channel manager 356 and waveform manager 338 are examples of implementations of channel manager 132 and waveform manager 128, respectively, in FIG. 1. As depicted, channel manager 356 comprises main processor 340, spectrum sensing function 352, and channel selector 354.

Main processor 340 is configured to process information and control spectrum sensing function 352 and channel selector 354. As depicted, main processor 340 is configured to receive user input 344, information 346 retrieved from database 348, and data requests 350. Information 346 may include any number of regulations, rules, and/or conditions that determine which channels may be used for communications by radio 300. In one illustrative example, main processor 340 uses user input 344, information 346, and data requests 350 to generate commands and send these commands to spectrum sensing function 352.

In response to receiving commands from main processor 340, spectrum sensing function 352 begins searching for channels available to radio 300 for communications. For example, spectrum sensing function 352 may receive sensing signals 360 from receiver 304. Sensing signals 360 may be received over a set of control channels, such as, for example, set of control channels 125 in FIG. 1.

Spectrum sensing function 352 uses sensing signals 360 to determine which channels are available to a set of radios with which communications is desired. For example, in some cases, spectrum sensing function 352 may send sensing signals 361 to the set of radios with which communications are desired through transmitter 305. Sensing signals 361 may include probing signals requesting an identification of which channels are available for communications to the set of radios. A portion of sensing signals 360 received through receiver 304 may be responses to these probing signals.

In some cases, sensing signals 360 may include probing signals received from another radio. In these cases, sensing signals 361 sent from spectrum sensing function 352 may include an identification of available channels for communications. In this manner, at least a portion of sensing signals 360 and sensing signals 361 may be used by radio 300 to coordinate with other radios.

Further, spectrum sensing function 352 may also use sensing signals 360 to generate environmental information about communications environment 358. Communications environment 358 is the radio frequency environment with respect to radio 300. Spectrum sensing function 352 is configured to send this environmental information along with an identification of available channels to main processor 340.

Main processor 340 uses the information provided by spectrum sensing function 352 to generate commands and send these commands 351 to channel selector 354. Further, channel selector 354 may also receive at least one of the environmental information about communications environment 358 and an identification of available channels from spectrum sensing function 352.

In response to receiving commands from main processor 340 and information from spectrum sensing function 352, channel selector 354 identifies a set of data channels for establishing communications between radio 300 and the set of radios with which data is to be exchanged. Channel selector 354 may send the identification of this set of data channels, and in some cases, the environmental information identified by spectrum sensing function 352 to waveform manager 338.

Waveform manager 338 is configured to use the information provided by channel selector 354 to design an on-demand modulation waveform for use in exchanging data over the set of data channels identified by channel selector 354. This modulation waveform may be designed using an optimization problem, such as optimization problem 144 in FIG. 1. In particular, waveform manager 338 generates a sampled modulation waveform comprised of a number of sampled orthogonal waveforms that meet a number of constraints. The sampled modulation waveform may be an example of sampled modulation waveform 140 in FIG. 1.

Receiver subsystem 324 may be configured to use a sampled form of the modulation waveform designed by waveform manager 338 to extract output data stream 362 from digital message signal 314. In particular, receiver subsystem 324 demodulates digital message signal 314 using the sampled modulation waveform to extract output data stream 362.

Transmitter subsystem 328 may use a sampled form of the modulation waveform designed by waveform manager 338 to encode input data stream 364 within digital message signal 326. In particular, transmitter subsystem 328 modulates the sampled modulation waveform with input data stream 364 to form digital message signal 326.

Figure 4:
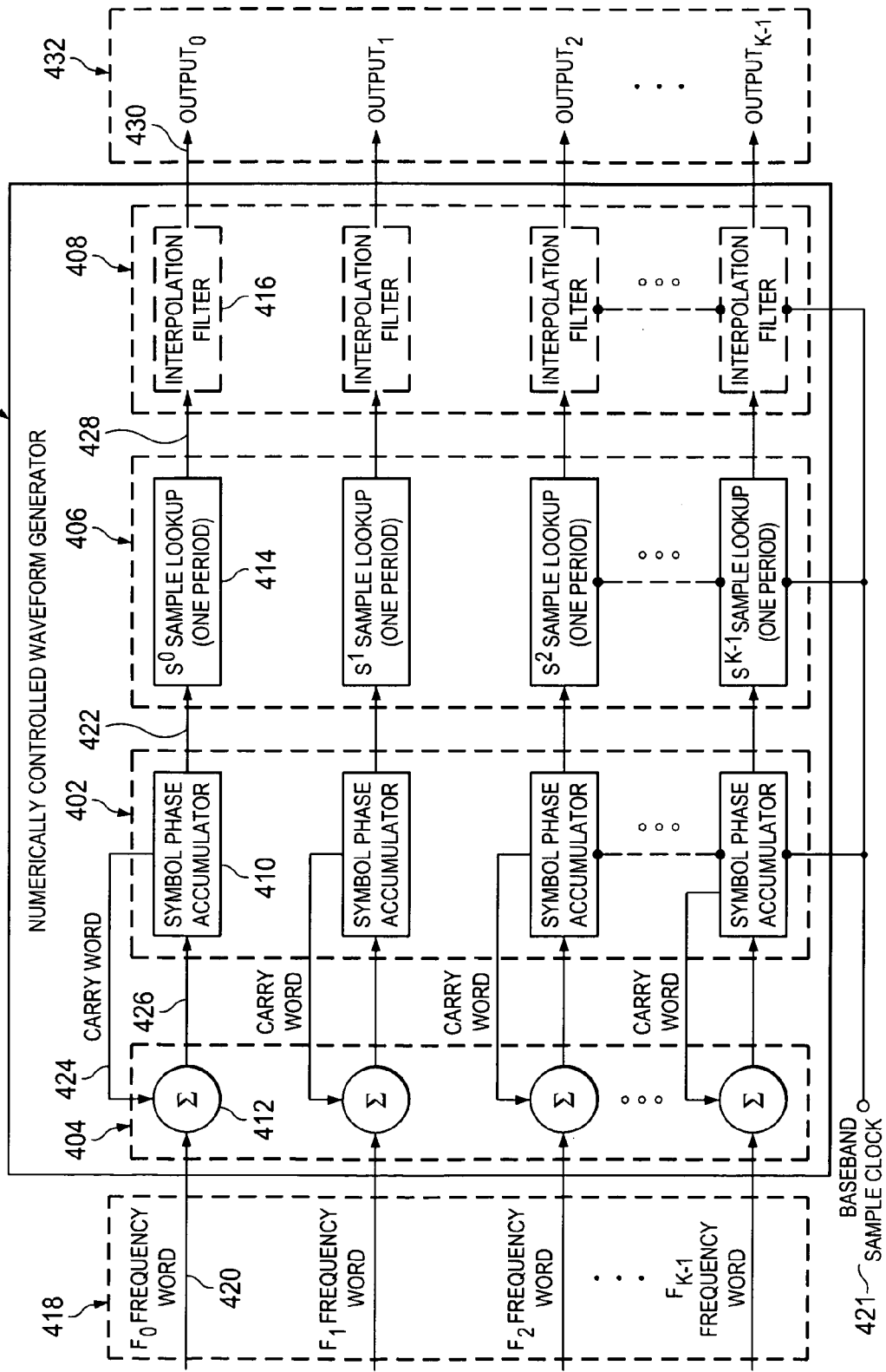
FIG. 4 is an illustration of a numerically controlled waveform generator in accordance with an illustrative embodiment.

With reference now to FIG. 4, an illustration of a numerically controlled waveform generator is depicted in accordance with an illustrative embodiment. In this illustrative example, numerically controlled waveform generator 400 may be implemented within signal processor 306 in FIG. 3. In particular, numerically controlled waveform generator 400 may be shared by both receiver subsystem 324 and transmitter subsystem 328 in FIG. 3.

In this illustrative example, numerically controlled waveform generator 400 comprises symbol phase accumulator unit 402, carrying unit 404, sample lookup unit 406, and interpolation unit 408. In this illustrative example, numerically controlled waveform generator 400 is configured to up-convert the sampled modulation waveform generated by waveform manager 338 in FIG. 3 from a baseband frequency to an intermediate frequency.

Symbol phase accumulator unit 402 comprises a number of symbol phase accumulators corresponding to the number of sampled orthogonal waveforms that form the sampled modulation waveform. Each of the number of sampled orthogonal waveforms corresponds to a channel in the set of data channels selected for exchanging data.

Further, carrying unit 404, sample lookup unit 406, and interpolation unit 408 comprise a number of carrying functions, a number of lookup functions, and a number of interpolation filters, respectively, corresponding to the number of sampled orthogonal waveforms. The number of sampled orthogonal waveforms may be, for example, K. The index used for these sampled orthogonal waveforms may be j=0, 1, 2, . . . , K−1.

Symbol phase accumulator unit 402 uses number of frequency words 418 to up-convert the number of sampled orthogonal waveforms to the desired intermediate frequency. In this illustrative example, each of the frequency words in number of frequency words 418 is a sequence of binary digits that represents the fraction of the desired intermediate frequency over the reference frequency of baseband sample clock 421. Baseband sample clock 421 may also be referred to as a reference clock.

In one illustrative example, the different frequency words in number of frequency words 418 may all be the same. However, in another illustrative example, one or more of the frequency words in number of frequency words 418 may be different from the other frequency words.

For the sampled orthogonal waveform with j=0, frequency word 420 in number of frequency words 418 is sent as input into symbol phase accumulator 410 in symbol phase accumulator unit 402. Symbol phase accumulator 410 may have a selected resolution. One complete cycle of the sampled orthogonal waveform may have a particular phase range. The selected resolution of the symbol phase accumulator 410 determines the number of steps by which this particular phase range may be divided.

Symbol phase accumulator 410 computes phase value 422 based on frequency word 420. Phase value 422 may be, for example, the phase value at the point along the particular phase range for the sampled orthogonal waveform corresponding to baseband sample clock 421 adjusted by the number of steps indicated by frequency word 420.

As an illustrative example, when frequency word 420 indicates that the desired intermediate frequency is five times the frequency of baseband sample clock 421, phase value 422 output from symbol phase accumulator 410 jumps by five steps within the phase range for the sampled orthogonal waveform for each clock cycle of baseband sample clock 421. When frequency word 420 indicates that the desired intermediate frequency is one fourth of the frequency of baseband sample clock 421, phase value 422 output from symbol phase accumulator 410 jumps by one step within the phase range for the sampled orthogonal waveform only after four clock cycles of baseband sample clock 421 have lapsed.

Once the entire phase range for the sampled orthogonal waveform has been stepped through, symbol phase accumulator 410 may adjust carry word 424. Carry function 412 in carrying unit 404 adjusts frequency word 420 by carry word 424 such that symbol phase accumulator 410 wraps around modulo the total phase range for the sampled orthogonal waveform upon reaching beyond the end of the phase range.

Phase value 422 is sent as input into lookup function 414 in sample lookup unit 406. Lookup function 414 uses stored values of the sampled orthogonal waveform to output amplitude 428 of sampled orthogonal waveform at phase value 422.

Amplitude 428 is sent to interpolation filter 416 in interpolation unit 408. Interpolation filter 416 may interpolate amplitude 428 to generate orthogonal output 430. In some illustrative examples, interpolation unit 408 is not included in numerically controlled waveform generator 400. Instead, amplitude 428 is output from numerically controlled waveform generator 400 instead.

In this manner, numerically controlled waveform generator 400 may use number of frequency words 418 and the number of sampled orthogonal waveforms generated by waveform manager 338 to generate number of orthogonal outputs 432. An orthogonal output may be generated for each sampled orthogonal waveform for each clock cycle of baseband sample clock 421.

Figure 5:
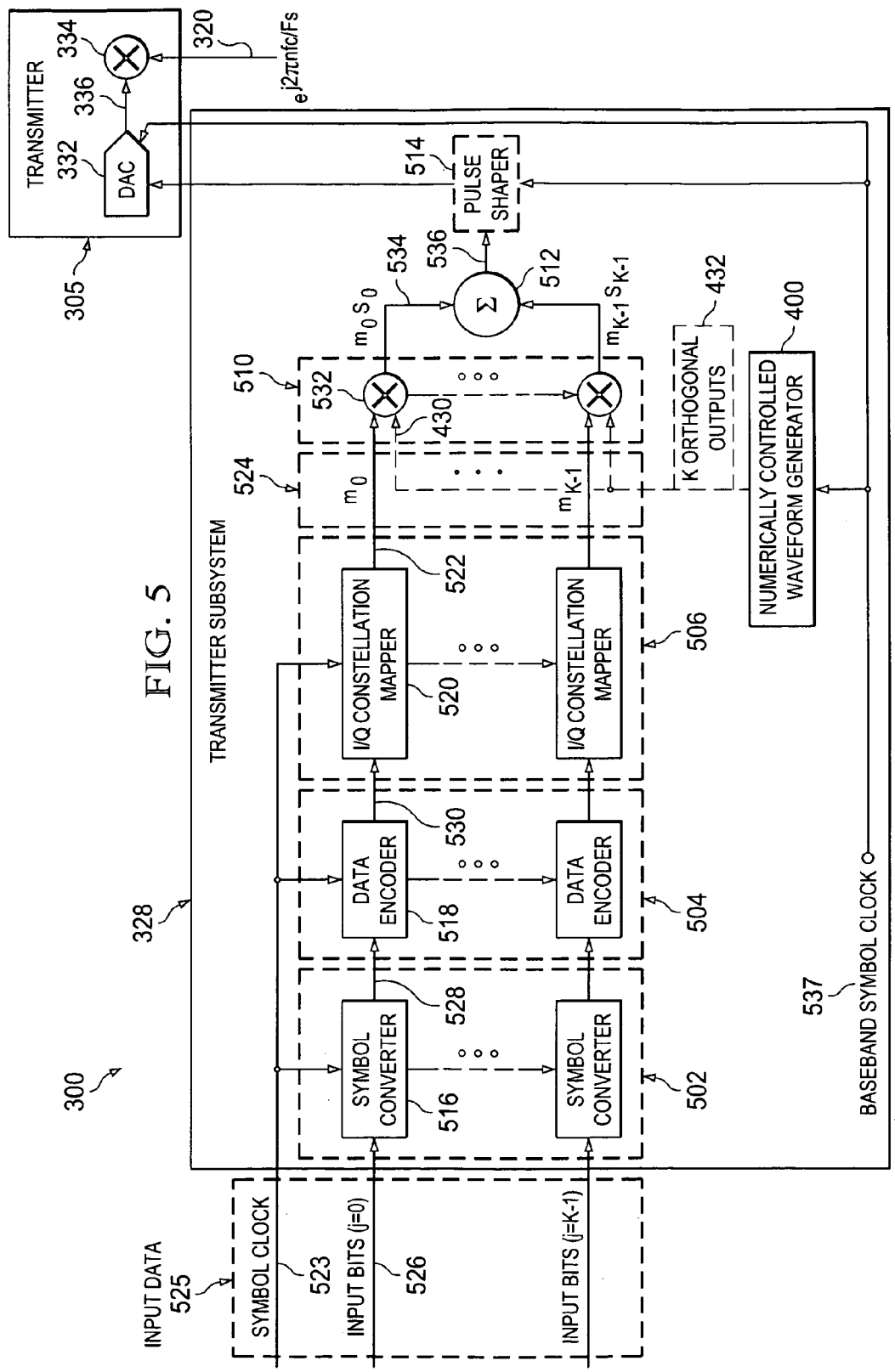
FIG. 5 is an illustration of a transmitter subsystem in accordance with an illustrative embodiment.

Turning now to FIG. 5, an illustration of a transmitter subsystem is depicted in accordance with an illustrative embodiment. In this illustrative example, transmitter subsystem 328 from FIG. 3 is described in greater detail.

As depicted, transmitter subsystem 328 comprises symbol converter unit 502, data encoding unit 504, constellation mapping unit 506, modulation unit 510, summer 512, and pulse shaping filter 514. Symbol converter unit 502, data encoding unit 504, constellation mapping unit 506, and modulation unit 510 may comprise a number of symbol converters, a number of data encoders, a number of constellation mappers, and a number of modulators, respectively, that correspond to the number of sampled orthogonal waveforms generated by waveform manager 338 in FIG. 3.

Input bits 526 is the portion of input data stream 364 from FIG. 3 that is to be encoded onto the sampled orthogonal waveform with j=0. This encoding is performed by sending input bits 526 into symbol converter 516. Symbol converter 516 converts input bits received within one cycle of symbol clock 523 into symbol 528. Symbol 528 is sent into data encoder 518 and encoded by data encoder 518 to form encoded symbol 530. Encoded symbol 530 is a set of symbols that includes forward error correction and/or synchronization information encoded into the symbols.

Encoded symbol 530 is then sent as input into constellation mapper 520. Constellation mapper 520 is configured to map encoded symbol 530 to a constellation point in the I-Q plane in a constellation diagram. Constellation mapper 520 outputs constellation point 522. In this manner, transmitter subsystem 328 may use input data stream 362 to generate number of constellation points 524.

Number of constellation points 524 may be sent into modulation unit 510 along with number of orthogonal outputs 432 generated by numerically controlled waveform generator 400 from FIG. 4. Numerically controlled waveform generator 400 receives baseband sample clock 537. Baseband sample clock 537 may be implemented using baseband sample clock 421 in FIG. 4 in some illustrative examples. Modulation unit 510 is configured to modulate number of orthogonal outputs 432 with number of constellation points 524. For example, modulator 532 is configured to modulate orthogonal output 430 with constellation point 522 to form modulated output 534.

All of the modulated outputs generated by modulation unit 510 are sent into summer 512. Summer 512 sums these modulated outputs to form initial digital message signal 536. Pulse shaping filter 514 is configured to reduce intersymbol interference in initial digital message signal 536 to form digital message signal 326. Pulse shaping filter 514 operates based on baseband sample clock 537. Baseband sample clock 537 may also be directly input into digital to analog converter 332. Digital message signal 326 is sent as input into digital to analog converter 332 in transmitter 305. In some illustrative examples, pulse shaping filter 514 may not be included in transmitter subsystem 328 and initial digital message signal 536 may be digital message signal 326 sent to digital to analog converter 332.

Figure 6:
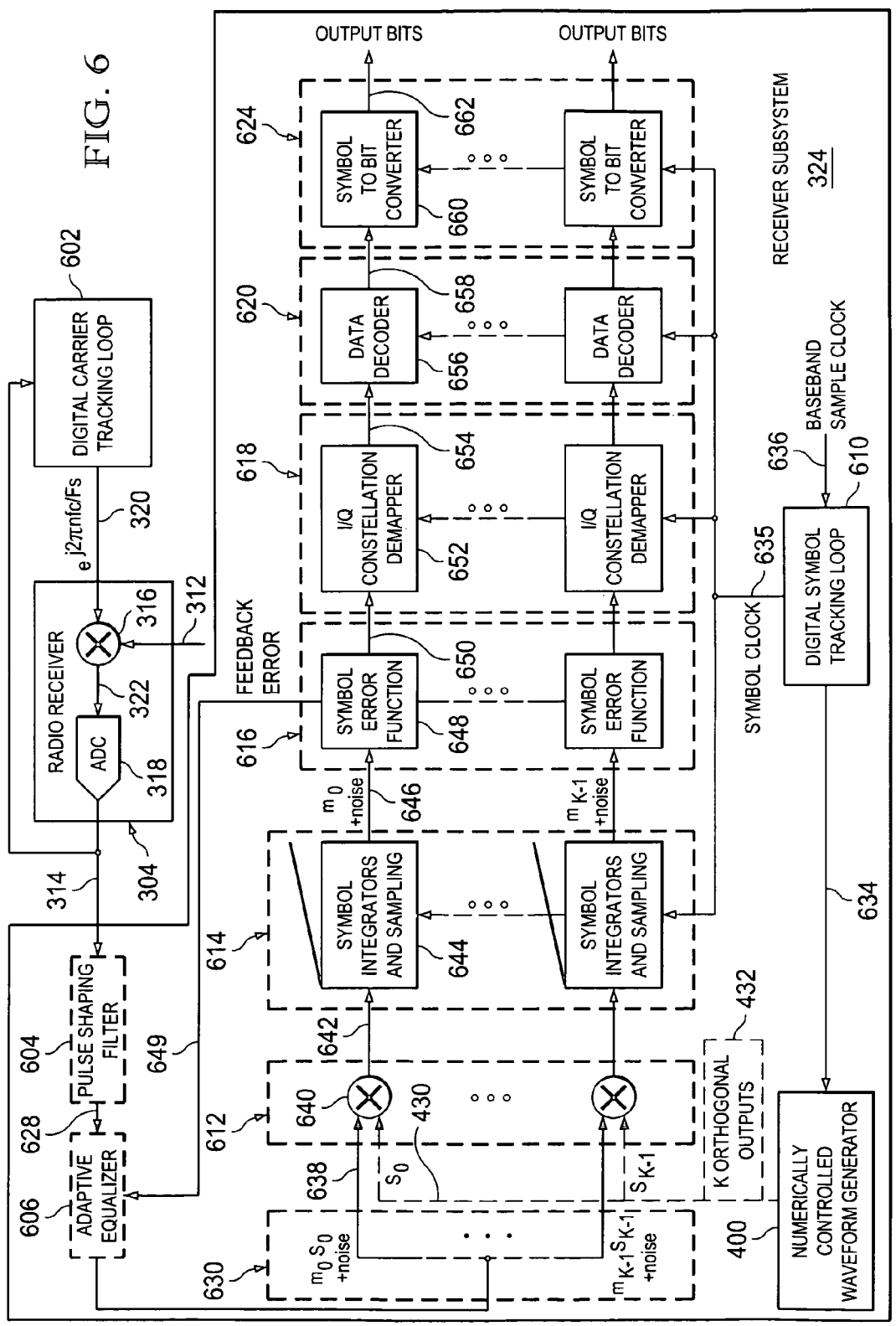
FIG. 6 is an illustration of a receiver subsystem in accordance with an illustrative embodiment.

With reference now to FIG. 6, an illustration of a receiver subsystem is depicted in accordance with an illustrative embodiment. In this illustrative example, receiver subsystem 324 from FIG. 3 is described in greater detail.

As depicted, receiver subsystem 324 comprises pulse shaping filter 604, adaptive equalizer 606, demodulation unit 612, symbol integration and sampling unit 614, symbol error unit 616, constellation demapping unit 618, data decoding unit 620, and symbol to bit converter unit 624.

As depicted, demodulation unit 612, symbol integration and sampling unit 614, symbol error unit 616, constellation demapping unit 618, data decoding unit 620, and symbol to bit converter unit 624 may comprise a number of demodulators, a number of symbol integrators and samplers, a number of constellation demappers, a number of data decoders, and a number of symbol to bit converters, respectively, corresponding to the number of sampled orthogonal waveforms.

Receiver 304 outputs digital message signal 314. Digital carrier tracking loop 602 may be configured to synchronize the carrier frequency of receiver 304 with the carrier frequency of digital message signal 314 to form the carrier frequency.

In this illustrative example, pulse shaping filter 604 is configured to receive digital message signal 314 output by receiver 304. Pulse shaping filter 604 is configured to reduce inter-symbol interference in digital message signal 314 to form shaped message signal 628. Adaptive equalizer 606 is configured to receive shaped message signal 628 and use feedback error 649 to modify shaped message signal 628 and separate shaped message signal 628 into a number of modified message signals 630.

Adaptive equalizer 606 sends number of modified message signals 630 into demodulation unit 612. Further, number of orthogonal outputs 432 generated by numerically controlled waveform generator 400 from FIG. 4 may be sent into demodulation unit 612. Demodulation unit 612 is configured to demodulate each modified message signal using a corresponding orthogonal output.

For example, modified message signal 638 output by adaptive equalizer 606 and orthogonal output 430 output by numerically controlled waveform generator 400 are sent into demodulator 640. Demodulator 640 demodulates modified message signal 638 using orthogonal output 430 to form demodulated signal 642.

Demodulated signal 642 is sent into symbol integrator and sampler 644 in symbol integrator and sampling unit 614. Symbol integrator and sampler 644 integrates demodulated signal 642 over the period of one symbol and then samples this integration to form constellation point 646.

Symbol integrator and sampler 644 outputs constellation point 646. Constellation point 646 is sent into symbol error function 648 in symbol error unit 616. Symbol error function 648 is configured to generate feedback error 649 that is sent into adaptive equalizer 606. Symbol error function 648 is configured to remove the contribution of noise to constellation point 646 to form modified constellation point 650. Modified constellation point 650 is sent into constellation demapper 652 in constellation demapping unit 618.

Constellation demapper 652 uses modified constellation point 650 to leave the I-Q plane in the constellation diagram and extract encoded symbol 654. Constellation demapper 652 sends encoded symbol 654 into data decoder 656 in data decoding unit 620. Data decoder 656 decodes encoded symbol 654 to form symbol 658. Symbol 658 is sent into symbol to bit converter 660 in symbol to bit converter unit 624. Symbol to bit converter unit 624 converts symbol 658 into output bits 662.

In this manner, receiver subsystem 324 is configured to extract output bits from each of number of modified message signals 630. These output bits may form output data stream 362 described in FIG. 3. In these illustrative examples, digital symbol tracking loop 610 is configured to synchronize baseband sample clock 636 to incoming analog signal 312 to form modified sample clock 634. Further, digital symbol tracking loop 610 may also output symbol clock 635, which may be used by symbol integration and sampling unit 614, constellation demapping unit 618, data decoding unit 620, and symbol to bit converter unit 624.

The illustrations of radio 300 in FIG. 3, numerically controlled waveform generator 400 in FIG. 4, transmitter subsystem 328 in FIG. 5, and receiver subsystem 324 in FIG. 6 are not meant to imply physical or architectural limitations to the manner in which an illustrative embodiment may be implemented. Other components in addition to or in place of the ones illustrated may be used. Some components may be optional.

Figure 7:
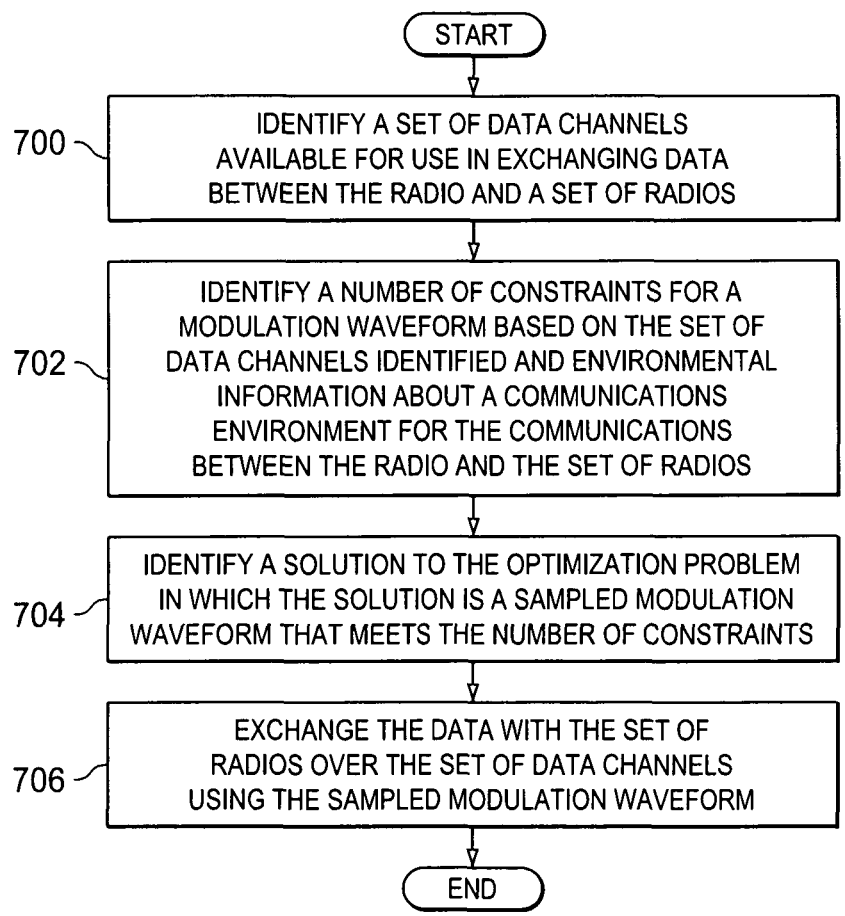
FIG. 7 is an illustration of a process for managing communications between communications systems in the form of a flowchart in accordance with an illustrative embodiment.

Turning now to FIG. 7, an illustration of a process for managing communications between communications systems in the form of a flowchart is depicted in accordance with an illustrative embodiment. The process illustrated in FIG. 7 may be implemented using communications system 102 in the form of radio 106 in FIG. 1. In particular, the process may be implemented using receiver 118, transmitter 120, and/or signal processor 122 in FIG. 1.

The process begins by identifying a set of data channels available for use in exchanging data between the radio and a set of radios (operation 700). Thereafter, the process identifies a number of constraints for a modulation waveform based on the set of data channels identified and environmental information about a communications environment for the communications between the radio and the set of radios (operation 702).

In operation 702, the number of constraints may be based on a number of selected criteria, such as number of selected criteria 137 in FIG. 1. Further, in operation 702, the number of constraints may be designed as a number of mathematical conditions for an optimization problem. In this manner, the optimization problem is a constraint optimization problem.

The process then identifies a solution to the optimization problem in which the solution is a sampled modulation waveform that meets the number of constraints (operation 704). The sampled modulation waveform may comprise a number of sampled orthogonal waveforms that may be used for exchanging data over the set of data channels identified in operation 700. In operation 704, the process produces sampled orthogonal waveforms that minimize the negative of the sum of the differences squared of the number of sampled orthogonal waveforms.

Thereafter, the radio may exchange the data with the set of radios over the set of data channels using the sampled modulation waveform (operation 706), with the process terminating thereafter. In operation 706, the radio may use the sampled modulation waveform to perform demodulation when the radio is receiving the data from the set of radios. Conversely, the radio may use the sampled modulation waveform to perform modulation when the radio is sending the data to the set of radios.

In operation 702, different types of constraints may be identified. For example, to meet criteria that require the sampled modulation waveform to be synchronized between a transmitter and a receiver with a desired level of accuracy, the time delay, $\tau_0$, between the incoming analog signal received by the receiver and the outgoing analog signal sent by the transmitter should be able to be estimated within selected tolerances.

In particular, a lower bound on the error, or variance, in the estimation of this time delay, $\tau_0$, should be minimized. Let $$x(t)=s(t-\tau_0)+w(t), 0 \leq t \leq T$$

be the analog signal received at the receiver with respect to time, t, over the time period, [0,T], where w(t) is Gaussian noise. The analog signal in a sampled form is as follow:

$$x[n]=x(n\Delta), n=0, 1, \ldots, N-1$$

where N is the total number of samples and n is the index number for the samples.

The Cramer-Rao lower bound (CRLB), a lower bound on the estimation error for the time delay, is $$\mathrm{var}(\hat{\tau}_0) \geq \frac{\sigma^2}{\sum_{n=0}^{N-1}\left(\frac{\partial s(t)}{\partial t}\bigg|_{t=n\Delta}\right)^2},$$

where the denominator can be approximated as $$\Sigma(s((n+1)\Delta)-s(n\Delta))^2,$$

which is the sum of the differences squared of the original signal.

Consequently, a constraint for the sampled modulation waveform may be designed as follows:

$$\min_{s=\{s_i^j\}} -\sum_{j=0}^{K-1}\sum_{i=0}^{N-1}|s_{i+1}^j - s_i^j|^2$$

where K is the number of sampled orthogonal waveforms in the sampled modulation waveform, N is the number of samples desired for each orthogonal waveform, and $\{s_i^j\}$, i=0, 1, 2, ..., N-1, j=0, 1, 2, ..., K-1 are the samples.

Further, an example of a constraint that may be designed based on the energy criteria is:

$$\Sigma_i(s_i^j)^2 \leq \text{total\_energy\_constraint}, j=0, 1, 2, \ldots, K-1$$

for each sampled orthogonal waveform. If time is factored into this constraint, then this constraint may be based on the power criteria.

An example of a constraint that may be designed based on bandwidth efficiency criteria is:

$$|\Im(\{s_i^j\})(F_m)|^2 \le \text{band\_energy\_constraint}, m=0, 1, \ldots, M_F-1,$$

where $\Im( )$ denotes the Fourier transform and $M_F$ are the frequency ranges in $\{F_m\}$.

The following constraint may be designed based on the waveform criteria requiring that the sampled modulation waveform comprises a basis set of sampled orthogonal waveforms:

$$\sum_i s_i^j s_i^{j'} = 0$$

for each pair $(j,j') j, j' \in \{0, 1, 2, \ldots, K-1\}$, $j < j'$. An approximation of this constraint may also be used:

$$-\varepsilon < \sum_i s_i^j s_i^{j'} < \varepsilon, \text{ or}$$

$$-2\varepsilon < 2\text{total\_energy\_constraint} - \sum_i (s_i^j - s_i^{j'})^2 < 2\varepsilon$$

where the designed waveforms are substantially orthogonal when $\varepsilon$ is less than a selected threshold.

Different constraints may be designed based on environmental criteria. For example, if $\{G_m\}$ is a set of frequency ranges with interference that needs to be avoided, a similar set of $M_G$ frequency range constraints may be used:

$$|\Im([m_0^i s, m_1^i s, \ldots, m_{k-1}^i s])(H_m)|^2 \le \text{multiple symbol band constraint}, i=0, 1, \ldots, l, m=0, 1, \ldots, M_G.$$

If multi-path interference is to be taken into account, the following constraint may be used, $$\left(\sum_i s_i^j\right) \cdot e_m = 0, m = 0, 1, 2, \ldots, M_e - 1$$

where $\{e_m\}$ is a basis for the null space of dimension $M_e$ frequency ranges.

Examples of constraints that may be designed based on frequency criteria may include:

$$|\Im([m_0^i s, m_1^i s, \ldots, m_{k-1}^i s])(H_m)|^2 \le \text{multiple\_symbol\_band\_constraint}, i=0, 1, \ldots, l, m=0, 1, \ldots, M_H$$

where $[m_0^i s, m_1^s, \ldots, m_{k-1}^i s]$ denotes the time samples across k chosen symbols for each waveform $s \in s^3$, with $\{H_m\}$ being the frequency ranges involved. The set $\{m_0^i, m_1^i, \ldots, m_{k-1}^i\}$ for each i is a chosen set of I sequences of modulation symbols of length k.

The different constraints described above are just examples of the different types of constraints that may be used for an optimization problem. Any number of constraints may be used for the optimization problem.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 8:
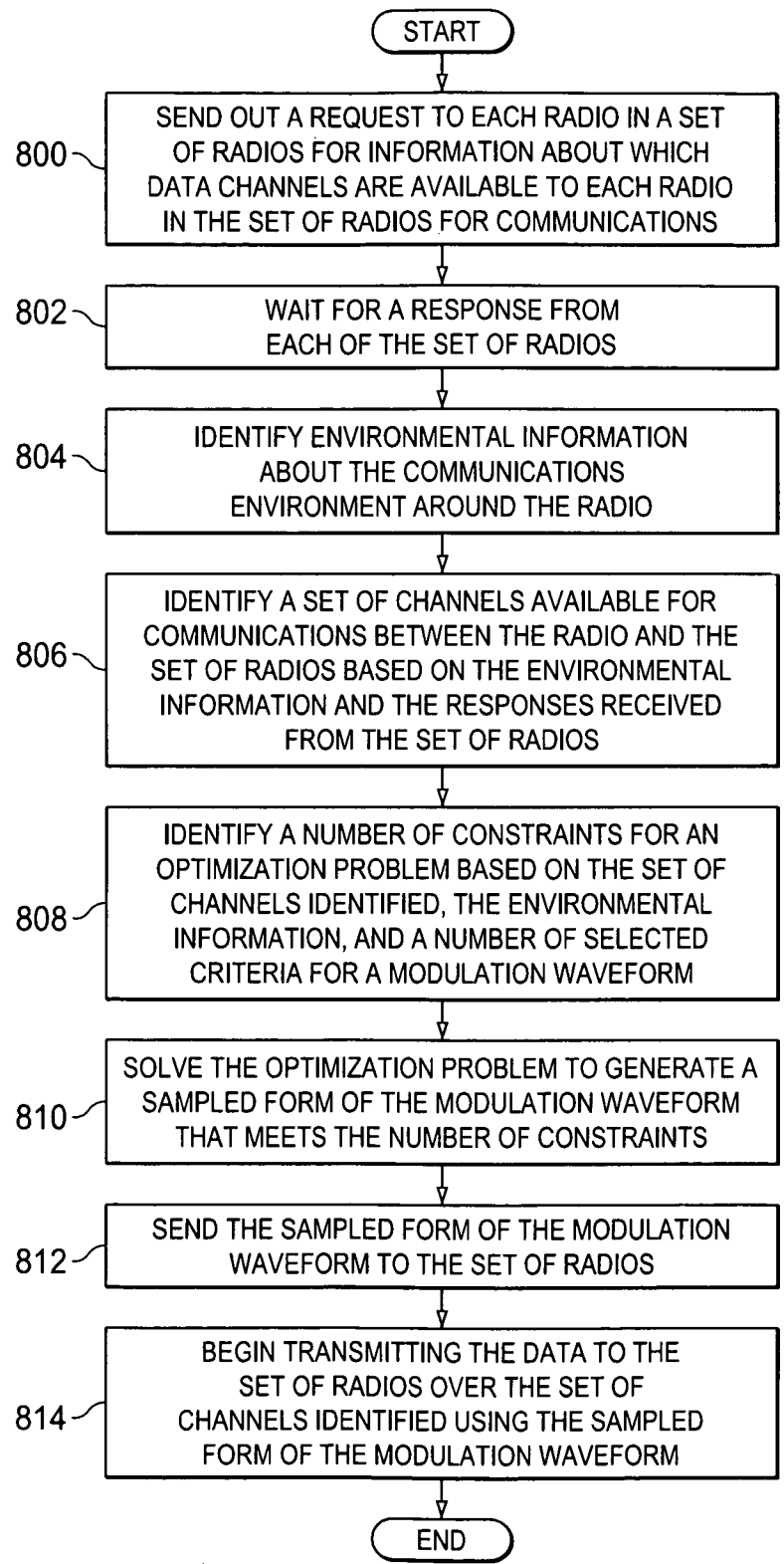
FIG. 8 is an illustration of a process for transmitting data in the form of a flowchart in accordance with an illustrative embodiment.

With reference now to FIG. 8, an illustration of a process for transmitting data in the form of a flowchart is depicted in accordance with an illustrative embodiment. The process illustrated in FIG. 8 may be implemented by a radio such as, for example, radio 106 in FIG. 1. For example, this process may be implemented by radio 106 to transmit data 110 to set of radios 108 in FIG. 1.

The process begins by the radio sending out a request to each radio in the set of radios for information about which data channels are available to each radio in the set of radios for communications (operation 800). The radio then waits for a response from each of the set of radios (operation 802).

Next, the radio identifies environmental information about the communications environment around the radio (operation 804). Thereafter, the radio identifies a set of data channels available for communications between the radio and the set of radios based on the environmental information and the responses received from the set of radios (operation 806).

The radio then identifies a number of constraints for an optimization problem based on the set of data channels identified, the environmental information, and a number of selected criteria for a modulation waveform (operation 808). The solution to the optimization problem is a modulation waveform that may be used to transmit the data to the set of radios.

Then, the radio solves the optimization problem to generate a sampled form of the modulation waveform that meets the number of constraints (operation 810). The radio sends an identification of the sampled form of the modulation waveform to the set of radios (operation 812). By performing operation 812, the set of radios may coordinate with the radio such that the set of radios may be able to receive the data transmitted by the radio. The identification of the sampled form of the modulation waveform may include some or all of the modulation waveform or information about the modulation waveform.

The radio then begins transmitting the data to the set of radios over the set of data channels identified using the sampled form of the modulation waveform (operation 814), with the process terminating thereafter. In particular, in operation 814, the data to be transmitted is used to modulate the modulation waveform to form a modulated modulation waveform that may be then used to modulate a carrier signal. The modulated carrier signal, carrying the data, is then transmitted to the set of radios over the set of data channels identified.

Figure 9:
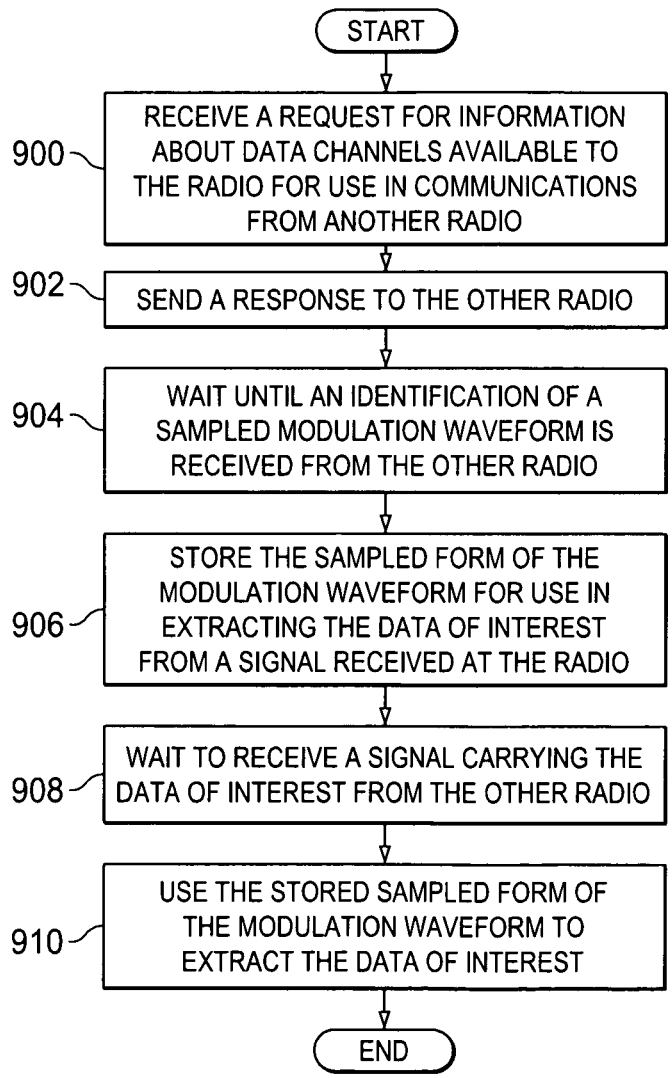
FIG. 9 is an illustration of a process for receiving data in the form of a flowchart in accordance with an illustrative embodiment.

With reference now to FIG. 9, an illustration of a process for receiving data in the form of a flowchart is depicted in accordance with an illustrative embodiment. The process depicted in FIG. 9 may be implemented by a radio, such as, for example, radio 106 in FIG. 1. For example, this process may be implemented by radio 106 to receive data 110 from another radio in set of radios 108 in FIG. 1.

The process begins by receiving a request for information about data channels available to the radio for use in communications from another radio (operation 900). In response to receiving the request from the other radio, the radio sends a response to the other radio (operation 902). Then, the radio waits until an identification of a sampled modulation waveform is received from the other radio (operation 904). The sampled form of the modulation waveform may be the modulation waveform to be used by the other radio when transmitting the data.

In response to receiving an identification of the sampled form of the modulation waveform, the radio may store the sampled form of the modulation waveform for use in extracting the data of interest from a signal received from the other radio (operation 906). The radio then waits to receive a signal carrying the data of interest from the other radio (operation 908). In response to receiving the signal carrying the data of interest from the other radio, the radio uses the stored sampled form of the modulation waveform to extract the data of interest (operation 910), with the process terminating thereafter.

Figure 10:
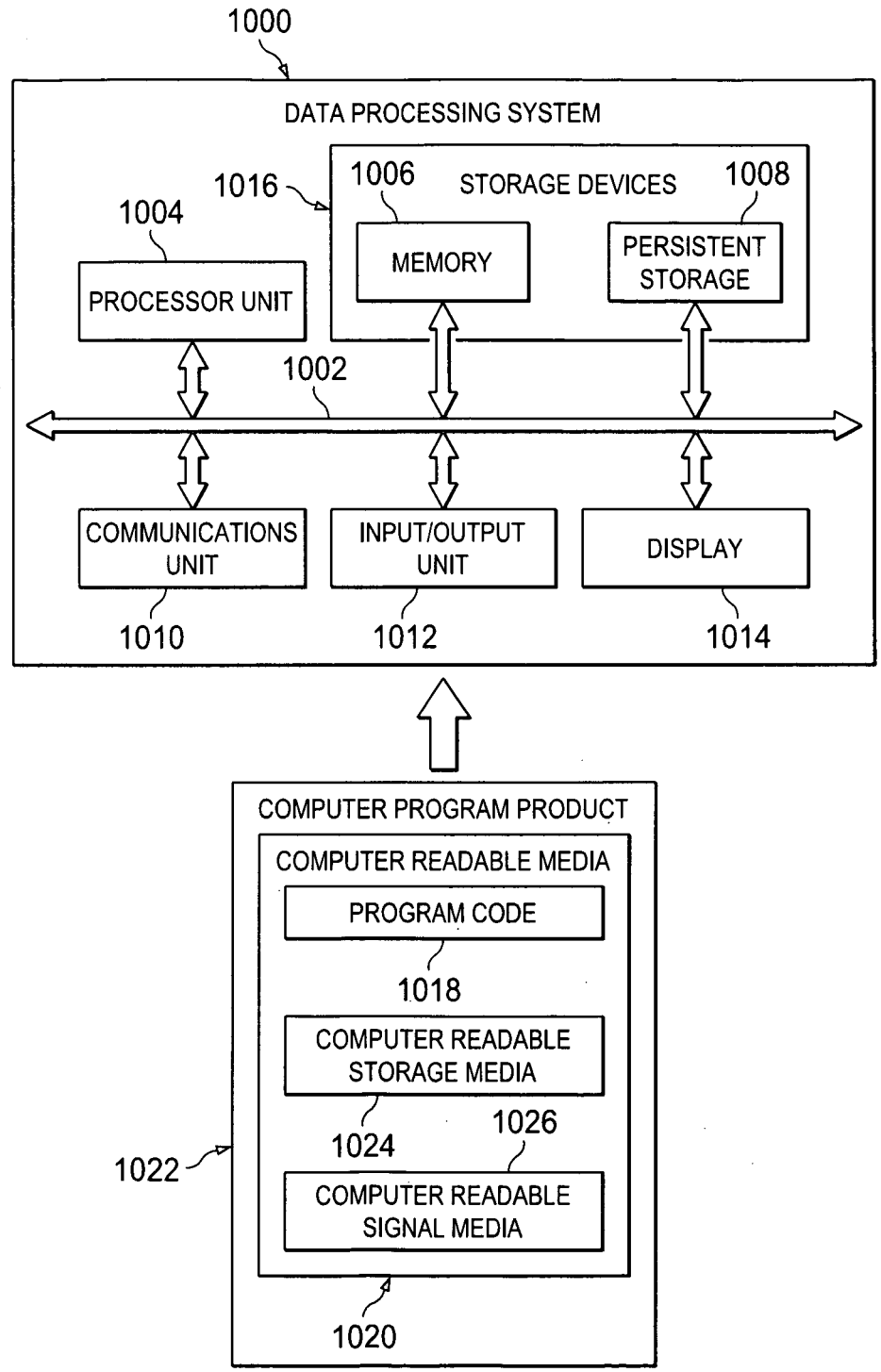
FIG. 10 is an illustration of a data processing system in accordance with an illustrative embodiment.

Turning now to FIG. 10, an illustration of a data processing system is depicted in accordance with an illustrative embodiment. In this illustrative example, data processing system 1000 may be used to implement signal processor 122 in FIG. 1 and/or one or more components within signal processor 122. In this illustrative example, data processing system 1000 includes communications framework 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 also may be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. In these illustrative examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026.

Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for the data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications framework 1002 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1006 or a cache, such as found in an interface and memory controller hub that may be present in communications framework 1002.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing communications by a communications system with a set of communications systems distinct from the communications system, the method comprising:
    identifying, using a channel manager, a set of data channels available for use in exchanging data between the communications system and the set of communications systems;
    identifying, in a waveform manager, a number of constraints based on a number of selected criteria for a modulation waveform based on the set of data channels identified and environmental information about a communications environment for the communications by a radio with a set of radios;
    generating, using the waveform manager, a mathematical condition for each constraint in the number of constraints;
    forming, using the waveform manager and the mathematical condition for each constraint, an optimization problem;
    solving, using the waveform manager, the optimization problem, such that solving the optimization problem satisfies the number of constraints for the set of data channels, while maximizing or minimizing a set of parameters;
    forming, on-demand, using a solution to the optimization problem, a unique and original customized modulation waveform, devoid of predefined modulated waveforms, that specifically and uniquely meets the number of constraints for the set of data channels; and
    using the customized modulation waveform exchanging the data between the communications system and the set of communications systems over the set of data channels by encoding and exchanging data over multiple channels comprised by the set of data channels simultaneously across an entirety of the set of data channels.

2. The method of claim 1, wherein the step of identifying the number of constraints for the modulation waveform comprises:
    identifying the number of constraints for the optimization problem based on the set of data channels identified and the environmental information, such that the modulation waveform meets the number of constraints with a level of accuracy that is higher than a modulation waveform selected from a set of predefined modulation waveforms.

3. The method of claim 1, wherein the number of selected criteria includes at least one of environmental criteria, regulatory criteria, system criteria, energy and power criteria, bandwidth efficiency criteria, and waveform criteria.

4. The method of claim 1, further comprising:
    generating, based on solving the optimization problem, a sampled form of the customized modulation waveform that meets the number of constraints; and
    using the sampled form of the customized modulation waveform in exchanging the data between the communications system and the set of communications systems over the set of data channels, the sampled form being customized for the number of constraints specific to communications between the radio and the set of radios over the set of data channels and under conditions of the communications environment.

5. The method of claim 1, further comprising:
generating, based on solving a constraint optimization problem, a number of sampled orthogonal waveforms that meet the number of constraints; and
using the number of sampled orthogonal waveforms in exchanging the data between the communications system and the set of communications systems over the set of data channels.

6. The method of claim 1, wherein the step of solving the optimization problem comprises:
identifying a number of sampled orthogonal waveforms for which a negative of a sum of differences squared for the number of sampled orthogonal waveforms is minimized.

7. The method of claim 1, wherein the step of identifying the set of data channels available for use in exchanging the data between the communications system and the set of communications systems comprises:
identifying the set of data channels available for use in exchanging the data between the communications system and the set of communications systems using sensing signals received from the set of communications systems.

8. The method of claim 1 further comprising:
receiving an incoming analog signal at a receiver in the communications system;
processing the incoming analog signal to form a digital message signal; and
demodulating the digital message signal using a sampled form of the customized modulation waveform to extract the data from the digital message signal.

9. The method of claim 8 further comprising:
receiving incoming radio waves over the set of data channels at a receiving antenna in the communications system;
converting, by the receiving antenna, the incoming radio waves into the incoming analog signal; and
sending, by the receiving antenna, the incoming analog signal to the receiver.

10. The method of claim 1 further comprising:
receiving the data at a transmitter in the communications system;
modulating a sampled form of the customized modulation waveform using the data to form a digital message signal;
converting the digital message to an analog message signal; and
modulating a carrier signal with the analog message signal to form an outgoing analog signal.

11. The method of claim 10 further comprising:
sending the outgoing analog signal to a transmitting antenna in the communications system;
converting, by the transmitting antenna, the outgoing analog signal into outgoing radio waves; and
transmitting the outgoing radio waves over the set of data channels.

12. An apparatus that comprises:
a channel manager in a communications system that comprises:
a spectrum sensing function that identifies a set of data channels available for use in exchanging data by the communications system with a set of communications systems distinct from the communications system; and
a waveform manager that comprises a processor configured such that in operation the waveform manager:
identifies a number of constraints based on a number of selected criteria for a modulation waveform for communications by a radio with a set of radios;
generates a mathematical condition for each constraint in the number of constraints;
forms, based upon the mathematical condition for each constraint, an optimization problem;
solves the optimization problem while maximizing or minimizing a set of parameters; and
forms, on-demand, based upon a solution to the optimization problem, a unique and original customized modulation waveform, devoid of predefined modulated waveforms, that specifically and uniquely meets the number of constraints for the set of data channels, wherein the customized modulation waveform exchanges the data between the communications system and the set of communications systems over the set of data channels by encoding and exchanging data over multiple channels comprised by the set of data channels simultaneously across an entirety of the set of data channels.

13. The apparatus of claim 12, wherein the waveform manager is configured to identify the number of constraints for the optimization problem based on the set of data channels identified and environmental information about a communications environment for communications by a radio.

14. The apparatus of claim 13, wherein the waveform manager is configured to: generate the solution to the optimization problem, and use the solution to generate a sampled form of the modulation waveform that meets the number of constraints, wherein the sampled form of the modulation waveform is configured for use by at least one of: a transmitter, and a receiver, to exchange the data between the communications system and the set of communications systems over the set of data channels, the sampled form being customized for the number of constraints specific to communications between the radio and the set of radios over the set of data channels and under conditions of the communications environment, such that the modulation waveform meets the number of constraints with a level of accuracy that is higher than a modulation waveform selected from a set of predefined modulation waveforms.

15. The apparatus of claim 14, wherein the sampled form of the modulation waveform comprises a number of sampled orthogonal waveforms.

16. The apparatus of claim 15, wherein the waveform manager is configured to solve the optimization problem by identifying the number of sampled orthogonal waveforms for which a negative of a sum of differences squared for the number of sampled orthogonal waveforms is minimized.

17. The apparatus of claim 13, wherein the optimization problem is a constraint optimization problem.

18. The apparatus of claim 12, wherein the number of selected criteria include at least one of environmental criteria, regulatory criteria, system criteria, energy and power criteria, bandwidth efficiency criteria, and waveform criteria.

19. The apparatus of claim 12, wherein the channel manager is configured to identify the set of data channels available for use in exchanging the data between the communications system and the set of communications systems using sensing signals received from the set of communications systems.

20. The apparatus of claim 12 further comprising:
a receiver in the communications system configured to receive an incoming analog signal, process the incoming analog signal to form a digital message signal, and demodulate the digital message signal using a sampled form of the modulation waveform to extract the data from the digital message signal.

21. The apparatus of claim 20 further comprising:
a receiving antenna in the communications system configured to receive incoming radio waves over the set of data channels, convert the incoming radio waves into the incoming analog signal, and send the incoming analog signal to the receiver.

22. The apparatus of claim 12 further comprising:
a transmitter comprised by the communications system and configured to: receive the data at the transmitter, modulate a sampled form of the modulation waveform using the data to form a digital message signal, convert the digital message to an analog message signal, and modulate a carrier signal with the analog message signal to form an outgoing analog signal.

23. The apparatus of claim 22 further comprising:
a transmitting antenna in the communications system configured to receive the outgoing analog signal from the transmitter, convert the outgoing analog signal into outgoing radio waves, and transmit the outgoing radio waves over the set of data channels.

\* \* \* \* \*